Figures 1, 2:
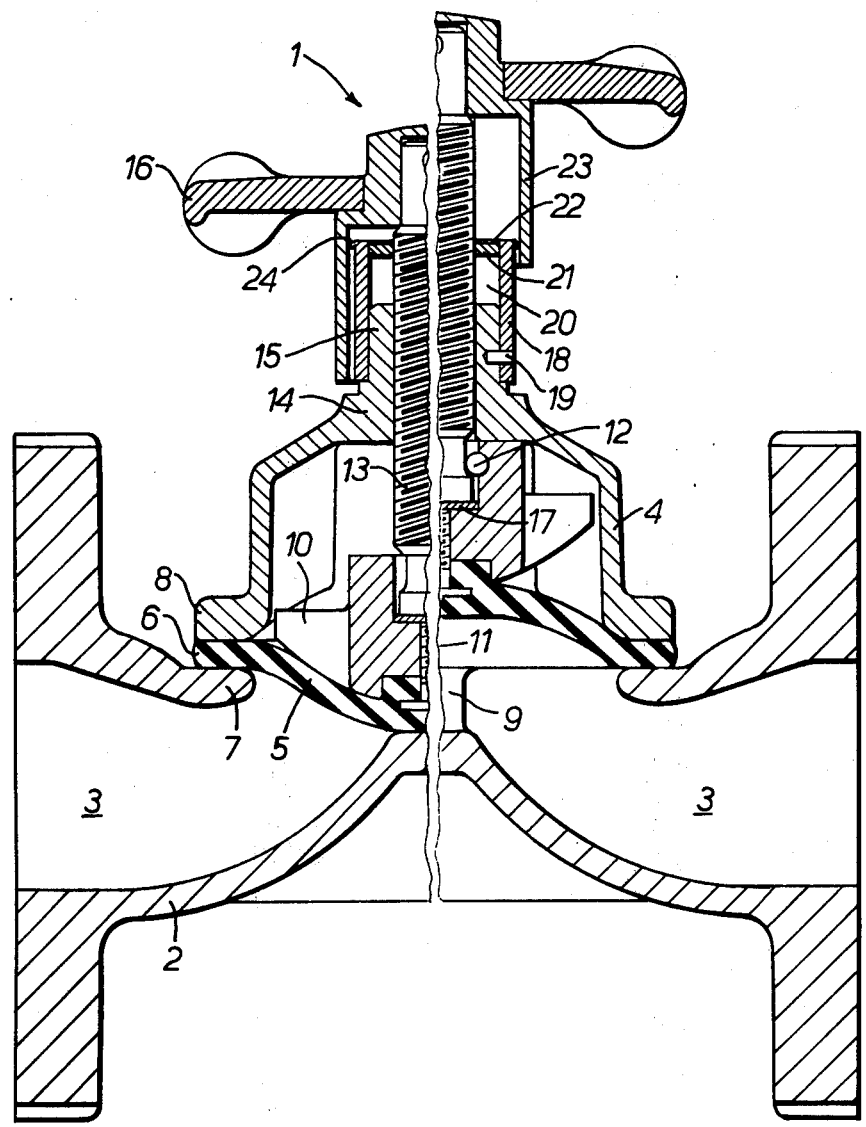

United States Patent [19]

Cocking et al.

[11] 4,051,865
[45] Oct. 4, 1977

[54] FLUID FLOW CONTROL VALVES

[75] Inventors: Glyn Cocking; John Owen Jones, both of Cwmbran, Wales

[73] Assignee: Saunders Valve Company Limited, Wales

[21] Appl. No.: 662,130

[22] Filed: Feb. 27, 1976

[30] Foreign Application Priority Data

Mar. 6, 1975 United Kingdom ............. 9452/75

[51] Int. Cl.² .................... F16K 31/50; F16K 7/16
[52] U.S. Cl. .............................. 137/556; 251/331; 251/355
[58] Field of Search .............. 251/214, 355, 331; 137/556, 553

[56] References Cited

U.S. PATENT DOCUMENTS

| 2,160,536 | 5/1939 | Buning | 251/214 |
|---|---|---|---|
| 2,186,833 | 1/1940 | Iler | 251/355 X |
| 3,238,968 | 3/1966 | Decis | 137/556 |
| 3,443,789 | 5/1969 | Glasgow et al. | 251/214 |
| 3,633,874 | 1/1972 | Veugelers, Jr. | 251/331 X |
| 3,802,462 | 4/1974 | Trosch | 251/331 X |

Primary Examiner—Arnold Rosenthal
Attorney, Agent, or Firm—Scrivener, Parker, Scrivener & Clarke

[57] ABSTRACT

A fluid flow control valve having a closure member movable by axial movement of a stem in which sealing means are provided between the valve body and a sleeve covering the part of the stem extending out of the valve body. Preferably the seal is a lip seal on a plastics sleeve secured to the body to provide an opening indicator and a lubricant reservoir.

7 Claims, 2 Drawing Figures

FLUID FLOW CONTROL VALVES

This invention relates to fluid flow control valves, and more particularly to fluid flow valves of the rising handwheel type.

Fluid flow control valves may include a closure member which moves translationally between a closed position in which the flow passage of the valve is closed and an open position in which the flow passage of the valve is open to fluid flow. An example of a valve of this type is the diaphragm valve which includes a closure member in the form of a diaphragm clamped at its periphery to the valve body and having a central portion movable translationally relative to the valve body between a closed position in engagement with a seat formed in the flow passage of the valve and an open position spaced from the seat.

The means provided for effecting translational movement of such closure members may include a stem in screw threaded engagement with a member fixed relative to the body of the valve, and a handwheel fixed to the free end of the stem to facilitate manual rotation of the stem. Rotation of the stem by means of the handwheel causes the stem to move axially relative to the valve body. The stem is coupled to the closure member whereby axial movement of the stem produces translational movement of the closure member. Axial movement of the stem results in translational movement of the handwheel relative to the body. Typically, as the closure member is moved from its closed position towards its open position the handwheel moves away from the valve body.

The above described rising handwheel system for moving a closure member is simple and cheap to construct, but suffers from the disadvantage that, when the valve is in the open position with the handwheel spaced at its maximum distance from the valve body, part at least of the stem is exposed and is accordingly subject to corrosion. This is particularly a problem when, as is common, the part of the stem which is exposed when the valve is open is the part of the stem which is in screw threaded engagement with the member fixed relative to the valve body, when the valve is closed. In this case, if the valve is exposed to, for example, severe weather conditions, and is left open for long periods, any lubricant on the stem may be washed away or contaminated with grit, making the valve difficult or impossible to close. Even if the valve is not exposed to severe weather or corrosive conditions the exposed stem covered in lubricating grease may render the valve unsuitable for many applications, for example in food processing plant, since there is a danger that grease on the exposed stem may fall or be rubbed from the stem and contaminate adjacent equipment or products.

It has been proposed to provide the handwheel with a depending annular skirt coaxial with the stem and to extend the member into which the stem is threaded outwardly from the valve to lie within the skirt whereby the exposed stem is shrouded by the skirt. This arrangement is not, however, wholly satisfactory since, especially when the valve is open, the gap between the skirt and the member into which the stem is threaded is large enough to permit ingress of grit, water, etc. to the cavity defined by the skirt and containing the exposed stem. Indeed, if the valve is used in a position in which the handwheel lies below the body of the valve, the cavity may form a reservoir for water, etc. and may therfore result in accelerated corrosion of the exposed stem. Further, this arrangement requires the member into which the stem is threaded to be longer than is required for effectively mounting the stem, and accordingly leads to increases in material and machining costs.

According to one feature of the present invention there is provided a fluid flow control valve comprising: a valve casing; an operating mechanism including an axially movable stem extending outwardly of the valve casing; a first annular member coaxial with the stem and coupled to the valve casing; a second annular member coaxial with the stem and coupled to the stem, the first and second annular members being of such a length as to axially overlap in all normal working positions of the stem; and seal means forming a seal between the first annular member and the second annular member.

The invention will be better understood from the following description of a preferred embodiment thereof, given by way of example only, reference being had to the accompanying drawings wherein:

FIG. 1 is a broken vertical cross sectional view of a rising hand wheel valve showing the valve in closed position; and FIG. 2 is a view similar to FIG. 1 but showing the valve in open position.

The rising handwheel diaphragm valve 1 shown in the drawings includes a valve casing comprising a valve body 2 defining a flow passage 3 and a bonnet 4, and a closure diaphragm 5 clamped at its periphery 6 between a flange 7 on the valve body and a flange 8 on the bonnet.

The diaphragm is movable between a closed position in which it engages a seat 9 formed on the valve body and an open position in which it is spaced from the seat by an operating mechanism including compressor 10 to which it is coupled by a stud 11. The compressor 10 is rotatably coupled by an offset pin 12 to a stem 13 of the operating mechanism which is in screw-threaded engagement with the upper part 14 of the bonnet 4. The upper part 14 of the bonnet includes a collar 15 which extends away from the valve body coaxially with the stem 13. A handwheel 16 is secured to the stem 13 to facilitate manual rotation of the stem which, because of the screw-threaded engagement of the stem and the bonnet, causes the stem to move axially. Axial movement of the stem moves the diaphragm between its closed and open positions. A thrust bearing 17 is positioned between the end of the stem 13 and the compressor 10 to reduce friction between the stem and the compressor as the stem is screwed into the bonnet to close the valve.

A plastics sleeve 18 is secured to the collar 15 by a pin 19. The sleeve 18 extends upwardly beyond the end of the collar to form with the stem 13 an annular grease reservoir 20. The grease reservoir 20 is packed with grease when the valve is assembled and serves to supply grease to the threads on the stem as the stem is moved through the grease reservoir when the valve is opened or closed. The upper end of the grease reservoir is closed by a felt washer 21 held in place by a locating flange 22 extending inwardly from the top edge of the sleeve 18. The felt washer wipes threads leaving the top of the grease reservoir as the valve is opened to ensure that the threads are covered by a film of grease and that no excessive quantity of grease is carried out of the grease reservoir.

Parts of the stem 13 extending above the flange 22 are shrouded by an annular skirt 23 depending from the handwheel and coaxial with the stem. A lip seal 24 formed on the upper end of the sleeve 18 cooperates with the inner surface of the skirt 23 to prevent foreign matter, for example grit or water, from entering the chamber defined between the stem 13, the flange 22, and the skirt 23. Thus, even if the valve is left in its fully open position for long periods in a hostile environment, no part of the stem 13 is exposed to corrosion or contamination by grit, etc.

It will be observed that the amount of the sleeve 18 exposed to view by the skirt 23 is a function of the amount by which the diaphragm is spaced from the seat 9. The amount of the sleeve 18 visible at any time is therefore an indication of the amount the valve is open. Preferably, the sleeve 18 is of a brightly coloured plastics contrasting in colour with the bonnet 4 and the skirt 23 so that an operator may easily determine from the amount of brightly coloured plastics visible whether the valve is closed (in which case none or very little of the sleeve will be visible), fully open, or in some intermediate state.

The skirt 23 may be of such a length that, when the valve is hard closed, it abuts the casing to prevent gross overclosure of the valve and consequent strain of the diaphragm.

What is claimed is:

1. A fluid flow control valve comprising: a valve casing; an operating mechanism including an axially movable stem extending outwardly of the valve casing; a first annular member coupled to the valve casing and including a part extending from said casing co-axially with the stem outwardly beyond where said stem enters said casing; a second annular member coaxial with the stem and coupled to the stem, the first and second annular members being of such length as to axially overlap in all normal working positions of the stem; and the first annular member being of an inside diameter larger than the outside diameter of the stem with its outwardly extending part defining a lubricant reservoir surrounding the stem where it enters the casing; and seal means located between the first annular member and the second annular member to form a seal therebetween.

2. A fluid flow control valve according to claim 1 wherein said seal means is a lip seal formed on one of said annular members.

3. A fluid flow control valve according to claim 2 wherein the annular member on which the lip seal is formed is of plastics material, the lip seal also being of plastics material and being formed integrally with the member.

4. A fluid flow control valve according to claim 1 wherein a washer closes said reservoir and is positioned to wipe the stem as it passes the washer.

5. A fluid flow control valve according to claim 1 wherein the inner one of the annular members is of visual appearance which contrasts with that of the other of the annular members.

6. A fluid flow control valve according to claim 5 wherein the inner one of the annular members is formed of a plastics material the colour of which contrasts with that of the other of the annular members.

7. A diaphragm valve comprising a valve body; a bonnet; a diaphragm clamped at its periphery between the valve body and the bonnet; an operating mechanism for moving said diaphragm, the operating mechanism including a stem screw-threadingly engaged with the bonnet and extending outwardly therefrom; a first tubular sleeve surrounding the stem and secured to the bonnet; a second tubular sleeve secured to the stem co-axially with the first tubular sleeve; and seal means providing a sliding seal between said first sleeve and said second sleeve, said first sleeve being of colour which contrasts with that of the second sleeve and being so positioned that when the valve is closed the second sleeve at least substantially completely covers the first sleeve, and said first sleeve being spaced from the stem to define a reservoir which is filled with lubricant.

* * * * *